Feb. 2, 1932.   L. M. POUGET   1,843,241
DEVICE FOR FORMING INFUSIONS
Filed May 4, 1928   3 Sheets-Sheet 1
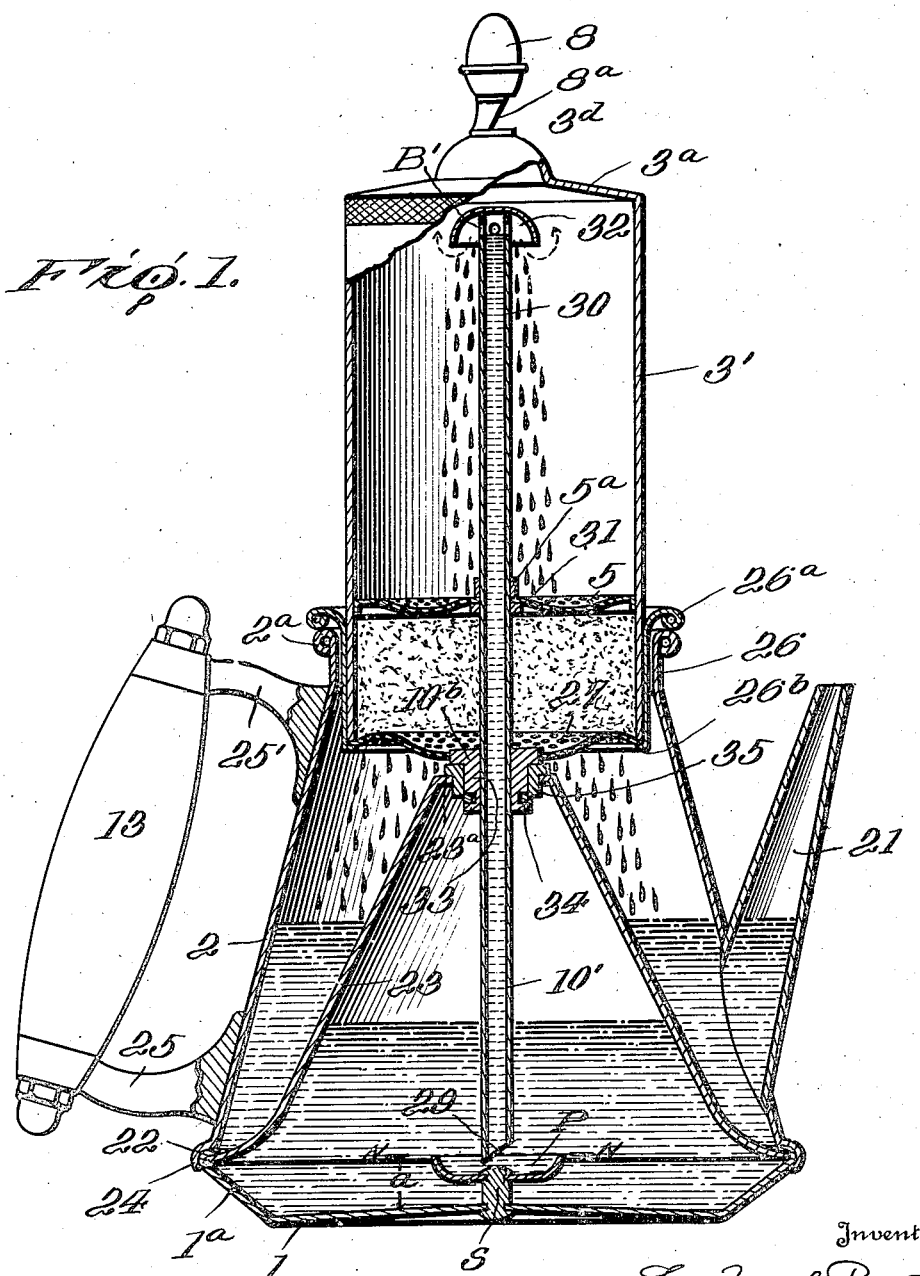

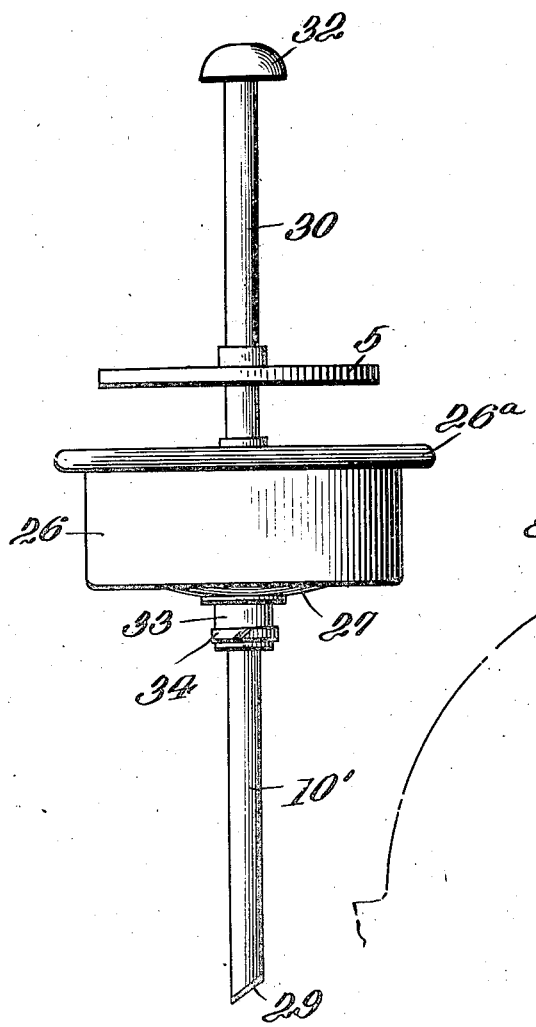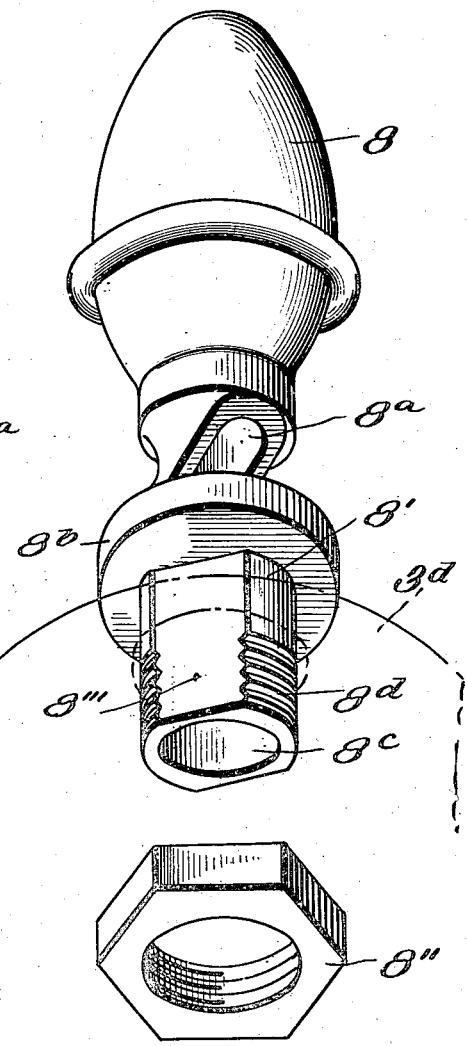

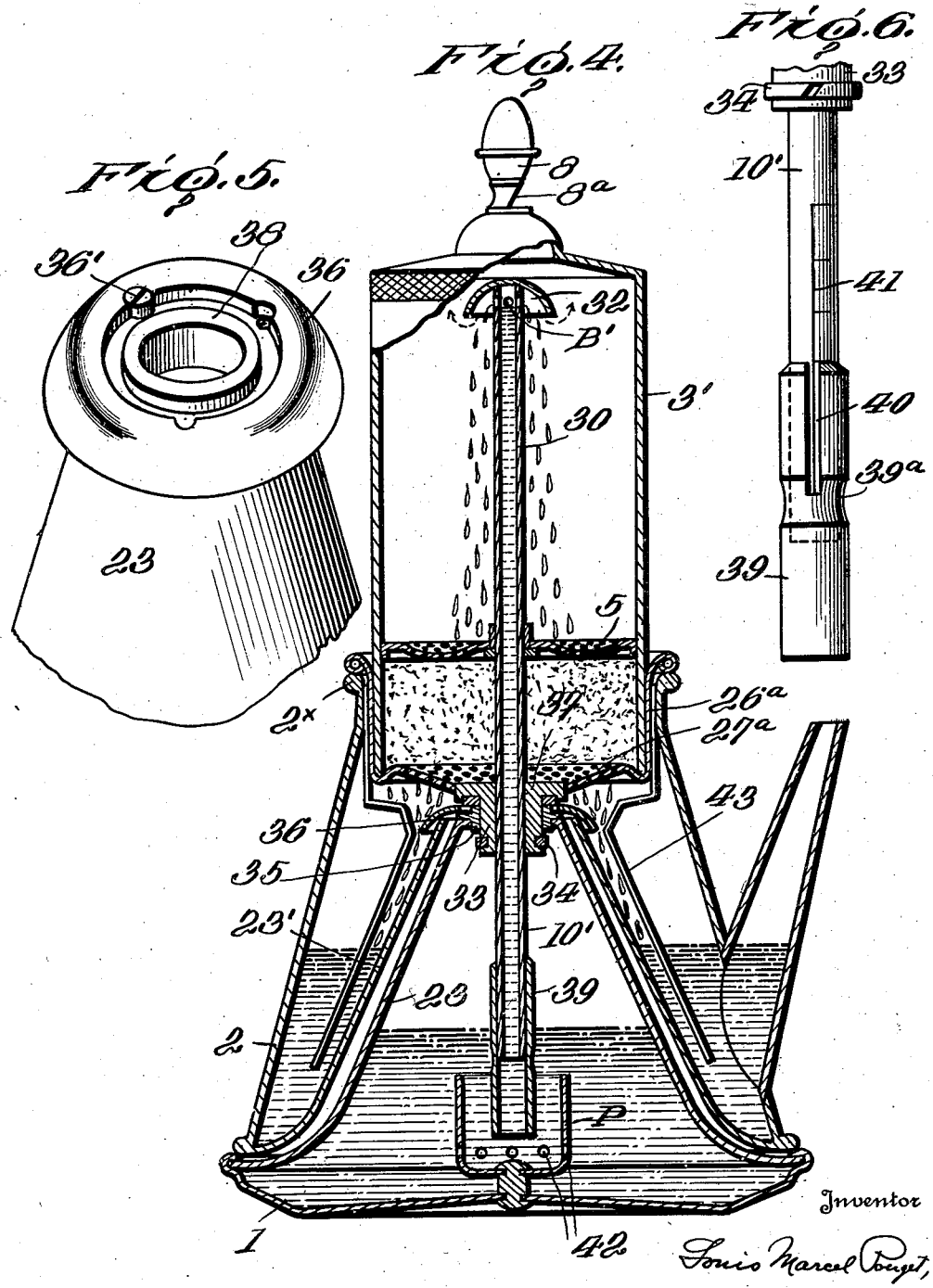

Patented Feb. 2, 1932

1,843,241

UNITED STATES PATENT OFFICE

LOUIS MARCEL POUGET, OF VALLIERES, FRANCE

DEVICE FOR FORMING INFUSIONS

Application filed May 4, 1928, Serial No. 275,190, and in France May 11, 1927.

This invention concerns improvements in devices for making infusions, and is particularly designed for the making of coffee, tea and like brews.

One of the objects of this invention is to provide an infusing device which is automatic in operation and which signals the completion of the brewing operation.

Another object is to provide safety mechanisms for the device, these mechanisms being without encumbrance to the device and in fact forming parts employed during the normal operation, and being inspectible during recharging, and of such construction that any defect therein is readily revealed during reassembly preparatory to the making of the new infusion.

A further object is the provision of a receptacle for the material from which the infusion is to be made, this receptacle being easily and conveniently filled and reassembled with the device for use.

Still another object of the invention is the provision of a container for the infusion when formed, which is so constructed and arranged with respect to the heating chamber for the infusing liquid that the finished infusion may be quickly and directly reheated without loss of its quality; this reheating is accomplished in a chamber adjacent the boiler proper and having a large surface for heating, this surface being arranged in such manner that no mixing of the several strata of the prepared infusion need occur during reheating.

Still another object is the provision of a cap or cupel which holds back a quantity of residual water for reheating of the infusion, and which is intended to determine the time of the alarm signaling the combustion of the brewing operation.

A still further object of the invention is the provision of a whistle forming the alarm signal and constituting a safety valve for the escape of steam under excessive pressure, so that the steam is not forced through the coffee layer by reason of stoppage of the whistle exit.

Still another object of the invention is the construction and arrangement of the parts of the device so that they may be made of sheet metal such as aluminum by spinning or die-forming, and in particular no soldered joints are required between the several parts.

Still another object of the invention is the construction of the device of a small number of assembled parts, which may be easily separated one from another for cleaning and recharging, and may be easily assembled and dismounted with respect to each other.

A further object of the invention is the provision of means whereby the infusing device may be regulated as to the quantity of its delivery so that it is possible to prepare a given quantity of infusion as needed.

A still further object of the invention is the construction and arrangement of the parts so that the container for the completed infusion may be of vitreous material such as porcelain or glass, and the remaining portions of the device which may be subject to a greater temperature and to the presence of steam under pressure may be made of metal.

With these and other objects in view as will appear in the course of the following specification and claims, two illustrative forms of execution of the structure are set forth on the accompanying drawings by way of example, in which:

Figure 1 is a vertical diametral section through a coffee pot embodying this invention.

Fig. 2 is a side elevation of the receptacle for the material thereby infused with its associated parts.

Fig. 3 is a view showing the safety whistle mechanism.

Fig. 4 is a vertical diametral section corresponding to Fig. 1 of a modified form of construction.

Fig. 5 is a perspective view of a detail of the device of Fig. 4.

Fig. 6 is a side elevation of the tube for the infusing liquid on a somewhat larger scale than that of Fig. 4.

These illustrative forms show the invention as employed with a coffee pot for the forming of the infusion known as "French drip" coffee. In each of the forms, there is provided a lower receptacle for the infusing liquid, here water; this lower receptacle or boiler being placed upon a heating surface and thereby being heated first to the vaporizing and then to the boiling point. A tube or duct leading upward from beneath the surface of the water in this boiler delivers the hot water into an upper chamber above the ground coffee or other material from which the infusion is to be made. The water trickles through this coffee and falls into an outer receptacle or receiver in which it remains until ready for pouring. In each of these devices the boiler is formed substantially as a cone with its apex upward, while the receiver is likewise formed as a cone with its apex upward, so that between the two is formed the annular receiving chamber for the liquid infusion. In each of the forms the duct for the infusing liquid supports two screens, one of which is the bottom screen supporting the ground coffee, while the upper rests upon the coffee and serves to distribute the hot water delivered from the upper end of the duct.

In the drawings, in the modification shown in Figs. 1, 2 and 3, the boiler comprises the bottom 1 having the dished edge 1a which is rebent at the extreme rim to embrace the conical wall 23, which has its apex directed upwardly. It is preferred to form this conical wall 23 with an outward flare at its bottom, and to join the conical wall 23 to the dished edge 1a by spinning the two edges together as shown at 22 in Fig. 1. At its top, the conical wall 23 is truncated and has an inwardly directed flange 23a. A bushing 35 is fixed on this flange, and is provided with a cylindrical aperture to receive the liquid duct as described hereinafter. Within the boiler formed by the walls 1, 1a, 23 is provided a cup P which is held in a predetermined spaced relationship above the bottom wall 1 by the stud S which has its initially reduced ends passed through apertures of the cup P and the wall 1 and is then riveted so that a rigid assembly is produced. The container for the infusion when formed comprises the external conical wall 2 which is joined at its bottom edge 24 to the bead 22 formed by the spinning together of the walls 1a and 23. It is preferred to form this conical wall 2 with a more acute apex angle than the conical wall 23, as shown in Fig. 1. The heat-insulating handle 13 is supported on two brackets 25, 25' which are secured to the conical wall 2 by riveting or welding or in other suitable and well known manner. The conical wall 2 is likewise formed with an aperture and supports the discharge spout 21; and at its upper edge it is provided with a curled bead. The conical walls 2 and 23 therefore provide an annular space for the reception of the liquid which has been infused, and in particular it will be noted that a very large surface of the conical wall 23 is in contact on the one hand with this liquid infusion and on the other hand with the contents of the boiler.

The sleeve 26 is formed with a curled upper stop flange 26a which rests when the device is assembled, upon the curled flange 2a of the wall 2. At its lower end the sleeve 26 is provided with a small inwardly projecting flange 26b which receives the lower grating 27. This lower grating 27 is of circular form and is provided with a number of small apertures which permit the passage of liquid but retain the ground coffee or other particles. A bushing 33 is secured centrally of the lower grating 27 and is fastened likewise in a predetermined position on the central liquid duct 10'. It will be understood that the sleeve 26 and its flange 26b may be permanently secured if desired to the lower grating 27, and the latter in turn by means of its bushing 33 may be permanently secured to the liquid duct 10', for example, by soldering, the external diameter of the bushing 33 permits it to have a close fit in the aperture of the bushing 35 on the wall 23a. The bushing 33 is likewise formed with a peripheral groove in which is located a split ring 34 resembling a piston ring, which forms a tight fit within the aperture of the bushing 35 and constitues a safety valve as will be described hereinafter.

The upper dome of the apparatus comprises the cylindrical casing 3' having its upper end closed by an end wall 3a provided with a boss 3d having an aperture therethrough to receive the sliding portion 8' of an indicating and safety valve, as shown in Fig. 3. The lower end of the sleeve 3' is received with a tight fit in the sleeve 26, and may be slid downward in this sleeve until its lower edge engages with the lower grating 27.

The liquid duct 10' has its lower end cut at a bevel 29 and so located that normally the axis of the duct 10' intersects the plane of this beveled end 26a at the intersection of the latter with the upper bounding plane of the cup 14 as shown in Fig. 1. Secured intermediate the length of the liquid duct 10' is the bushing 33 described above. The duct 10' extends upwardly past the bushing 33 and its upper end 30 carries the cap 32.

This cap 32 seals the end of the tube except for the apertures B' which permit the liquid in the tube to be discharged therefrom, with a diversion of the jets downward, as they contact with the inner wall of the cap 32, so that the liquid falls onto the upper grating 5 located above the ground coffee, and trickles through this grating and the coffee, and then through the lower grating 27 and is finally discharged into the annular space between the respective walls 2 and 23.

The upper grate 5 is mounted fixedly on a sleeve 5a which slides up and down on the liquid duct 10', and is limited in its sliding movement at the upper end of the duct by the cap 32 and at the lower end of its travel by a stop ring 31 secured to the tube. In this way the grates are held spaced apart by at least a minimum distance.

The combined whistle and safety valve mounted on the drum 3d comprise the upper externally ornamental and internally hollow chamber 8 having the lateral sound aperture 8a therein and formed integrally with a flange 8b which is extended downwardly in a tube 8' which is of the cross section presented by a cylinder having flattened portions 8''' at diametrally opposite sides externally. The central aperture 8c of the whistle and safety valve is open to the interior of the drum 3d. A lock nut 8'' may be threaded onto the portion 8d of the downwardly extending stem 8' of the whistle.

The device therefore comprises three principal parts which may be separated one from another: (1) a bottom portion comprising the bottom wall 1 and the two conical walls 2 and 23, and provided with the handle 13 and the spout 21; (2) the upper drum comprising the sleeve 3' with its end wall 3a and the whistle 8; (3) the charging system comprising the central duct 10' upon which are mounted the two grates 27 and 5 and the cup 26. These several parts may be made of metal by spinning or similar operations, so that the entire device is very light and cheap of manufacture.

In operation, the third separable element above, comprising the discharge duct 10' and the cup 26 with the gratings 27 and 5, is pulled out of the device by hand, and then the upper grating 5 is slid upward on the upper portion 30 of the duct 10' until the mouth of the cup 26 is free, the upper drum structure 3' having, of course, been previously removed. The cup 26 may now be filled with coffee and then the grating 5 moved downward until it substantially retains the ground coffee within the cup 26. While the parts are thus separated, the boiler enclosed by the walls 1 and 23 is filled with water, for example, to the level shown in Fig. 1. The charged cup and tube structure may now be reinserted into the bottom portion of the device and the upper drum 3' replaced by forcing it down within the inner wall of the cup 26, these operations being accomplished in any desired order so long as care is taken that the parts are not turned upside down during or after the assembly. The split ring 34 collapses under the pressure and spreads outward in the sleeve 35 and retains a tight fit therein, by reason of its own resiliency, which produces a friction to hold the duct 10' and its associated parts in position with respect to the boiler. This ring also seals the boiler space so that steam cannot escape therefrom into the annular chamber in the conical walls 2 and 23.

The charged device is then placed upon a heater. As the water is heated, the air trapped in the upper part of the boiler 1, 23, expands and the volume of gas at this point is increased in proportion to the heating and to the formation of vapor from the water itself, causing an upward movement of the water within the liquid duct 10' until finally this water passes through the apertures B' and is discharged onto the upper grate 5 and thereafter trickles through the coffee and enters the annular infused liquid space formed by the walls 2, 23. This infusion starts slowly and becomes faster and faster as more and more water is successively delivered at increased temperatures. Toward the end of the infusing operation the water is at a temperature approximately of the boiling point, and owing to such abundant delivery a water layer is formed on top of and in the ground coffee which constitutes a perfect seal and preventing, on the one hand, the access of steam to the coffee itself, or the passing of this steam through the dregs which would be injurious to the flavor of the infusion; and on the other hand it causes the steam immediately following it to seek an escape elsewhere from the dome 3'. The steam therefore is compelled to pass upward in the dome around the cap 32 and make its exit through the aperture 8c and the whistle hole 8a of the whistle knob 8, thus giving an alarm signal to the effect that the infusion is completed.

The diameter of the duct 10' and of the apertures B' is sufficient to permit the water to pass rapidly therethrough as the pressure increases, so that simply the resistance of the water column and the increased heat limits the delivery of the water.

While the boiler is heating and the water is being delivered, the gas pressure in the upper part of the boiler 1, 23 has forced the water out as aforesaid until the liquid level drops to substantially line N—N of Fig. 1. If any boiling of the water has occurred during this time, the cup 14 substantially prevents the steam bubbles from passing upward through the duct 10'. If the water level drops to the point N—N, a sharp cut-off occurs by reason of the shape of the cup and the duct 10' and steam is now permitted to escape from the boiler through the duct 10' and through the whistle, thus actuating the latter. The pressure is therefore equalized at this moment between the boiler and the upper dome 3', and a free relief of the boiler is afforded so that there is very little danger of explosion. In order, however, to prevent any danger whatsoever, the split ring 34, which has meanwhile served to prevent the passage of steam from the boiler into the receiving vessel, acts as a piston ring and the bushing 10b as a piston, so that both upper members of the device are forced upward and the excessive pressure relieves itself through the bushing 35 without danger of disrupting parts of the device.

A further safety device is provided in case of a plugging of the whistle aperture so that if the steam, by reason of excessive pressure, enters the upper dome 3' either through the duct 10' or through the safety alarm including the split ring 34 just mentioned and upward through the coffee layer, yet no disruption of the apparatus will occur since the pressure against the lower end of the steam 8' will cause this steam to move upward for the distance permitted by its securing nut 8'' and the steam may now escape along the flattened sides 8''' to the exterior of the device.

It will be noted that these safety devices require no adjustment nor any special care in superintendence or inspection, and that they are placed in order and ready for operation by the simple procedure of locating the several parts in their proper operative relationship, which may be done by a very unskilled person. Even if coffee grounds or the like should totally close the discharge apertures B', there is no danger of an explosion by reason of the permissive action of the safety devices.

When the coffee infusion is finished the device may be removed from the heater, allowed to drain and then the upper dome 3' and the coffee cup 26 may be withdrawn from the lower portion of the device and a suitably shaped lid located on the curled upper edge 2a of the outer wall 2, and the device may then be brought to the table for service in the usual way.

The present type of construction likewise lends itself to the reheating of the cold coffee. This reheating is very quickly accomplished and without loss of the major portion of the flavor. Since the cup P is located a distance above the bottom wall 1 of the boiler, the liquid lever N', N' when the signal is given represents a depth of water a in the container which is sufficient to protect the boiler if the device is not immediately removed from the fire, and also for use during this reheating.

In order to reheat the cold coffee located within the annular chamber of the walls 2, 23, the device is replaced on the heater and the remaining water in the bottom of the boiler is brought to the proper temperature. This may be done either with or without the dome 3' and the duct 10' in position; but for simplification it is preferred that it be done merely with a simple lid located on the curled flange 2a as described above. Owing to the great surface of the wall 23 which is exposed on the one hand to the coffee in the annular chamber and on the other hand to the temperature of the steam and hot water in the boiler itself, the coffee is rapidly brought to the proper degree of heat for drinking long before the water is exhausted from the boiler. If the dome 3' and the duct 10' are in position it is found that this temperature is attained even before the whistle 8 is again blown. This whistle, however, in such circumstances will be sounded to again indicate that the water is boiling, as a signal for removing the device from the heater.

A further advantage of such reheating is the fact that owing to the accomplishment of this heating along a vertical wall surface and in the form of a relatively thin ring of coffee in the annular chamber, there is very little mixing of various strata of the coffee liquor.

The several parts of the device according to this preferred form of construction are very easily taken apart and are all accessible for easy cleaning, and in fact a mere cold water rinsing will suffice, since all the parts are subjected to a high temperature which dissolves the coffee oil so that the latter can never form a fatty film adhering to the interior surface.

In the second form of execution of the invention shown in Figs. 4 to 6, most of the elements are as described with respect to the first modification. The bottom boiler wall 1 is again spun to the flared bottom edge of the conical wall 23, this latter being provided as before with the upper bushing 35 to receive the bushing 33 mounted on the duct 10' and having the split ring 34. The cup P in this modification is made deeper and is provided near its bottom with a number of small apertures 42. The outer conical wall 2 is in this instance joined fixedly to or formed integrally with a secondary inner wall 23'. The walls 2 and 23 may be formed of metal as in the first example, or of pottery, glass, etc. The beaded upper end 2x of the wall 2 receives the cup 26a which in the present instance is formed integrally with the lower grating 27a, which in turn is joined as before to the central bushing 33. The upper grating 5 is provided as before to slide up and down on the upper end 30 of the discharge duct which is provided with the cap 32 and the apertures B'. The dome 3' again fits within the cup 26a and is provided with a closed upper wall having the dome and a whistle 8.

At its lower end the tube 10' in the present form is provided with a sleeve 39 having finger engaging grooves 39a thereon so that this tube 39 may be slid up and down on the lower end of the tube 10', as shown in Fig. 6, for which purpose the upper end of the tube is split at 40 to afford a good resilient frictional grip on the lower end of the tube 10'. It is preferred to provide a scale 41 on the tube 10' which is graduated with divisions to indicate the number of cups of coffee to be produced.

In order to hold the boiler 1, 23 and the receptacle 2, 23' in the proper relationship to each other, the receptacle is permitted to rest at its lower edge upon the spun edge of the boiler 1, 23, while the upper edge of the wall 23' engages under a cap 36 which is secured to the bushing 35 on the boiler wall 23. For this purpose a screw 36' may be engaged in the bushing 35 and holds the cap 36 in its position. The bushing 33 rests on this assembly by means of a fibre washer 37 located in a recess of the bushing or socket 33, while the bushing 35 itself has a cylindrical upstanding flange 38 to engage with the inner part of the washer 37.

The operation of this device is substantially the same as that of the first modification, but by reason of the peculiar assembly of the lower end of the duct 10' it is possible to adjust the device before operation so that a predetermined number of cups will be obtained regardless of the amount of water contained within the boiler so long as a sufficient quantity is provided there. The coffee is placed within the cup 26a as before, and before assembling the device, the lower sleeve 39 is slid up along the lower end of the tube 10' until the scale 41 indicates the desired number of cups, which in the instance of Fig. 6 is three. The parts are then connected together in the same manner as before, and when the heating has progressed to such a stage that three cups of coffee have been formed by infusion and this quantity of water has been discharged from the boiler, the gas and steam in the upper part of the boiler may escape through the duct 10' as before and sound the alarm whistle. The cup P has been increased in depth over the first form of execution to permit this adjustment of the depth to which the steam will be discharged. It is essential that the lower end of the sliding sleeve 29 shall not come below the line of apertures 42 in the cup P and any suitable stop device may be provided to this end.

An advantage of this method of operation is that it is possible to brew one cup as well as two, with an equal flavor. If it be sought to accomplish the same result of brewing a single cup from a device having a capacity of several cups, it is found that by half or one-quarter filling the boiler the great volume of air in the upper part of the boiler will cause the small volume of water to be discharged at too low a temperature so that proper infusion does not occur. By the present arrangement it is possible to secure the infusion at substantially a uniform temperature, regardless of the number of cups to be brewed.

In order to secure a mixing of the various strata of liquor of coffee as infused, a baffle or collector 43 is shown located within the walls 2, 23' of the coffee receiver. As the coffee is poured out, a thorough mixing will occur, in addition to the mixing accomplished by the flow of the liquid from the grate 27a downwardly between the walls 43 and 23' and then upwardly between the walls 43 and 2 until a liquid level is established. It is obvious that this structure 43 need not extend for the entire periphery of the device.

What is claimed as new is:

1. In a device of the class described, a boiler, said boiler having a cylindrical mouth, a liquid duct leading from said boiler upwardly through the mouth, said duct being formed to substantially close said mouth and presenting a peripheral groove, a sealing ring in said groove and engaging the wall of the cylindrical mouth, and a receptacle for the material to be infused fixed on said duct.

2. In a device of the class described, a boiler of upwardly tapered conical form, a reservoir for the infusions having an external wall of upwardly tapered conical form to provide a thin annular space surrounding the boiler, a liquid duct leading from said boiler, a receptacle for the material to be infused, said duct discharging into said receptacle and said receptacle draining into said reservoir, and means to interrupt the delivery of liquid from said boiler prior to exhaustion.

3. In a device of the class described including a boiler, a reservoir for the infusion, a receptacle for the material to be infused and closed at its top, and a liquid discharge duct leading from said boiler into said receptacle so that liquid from the boiler is discharged into the receptacle and then drains into said reservoir, said boiler duct and receptacle forming a closed chamber, a hollow spindle slidable in the top of said receptacle and normally held by gravity in a lowered position but adapted to be raised by an excess of pressure in said receptacle into an upper position, the outer end of said spindle being formed as a whistle, said spindle being formed with a passage whereby a safety escape is provided when the spindle is moved under such pressure.

4. In a device of the class described, a boiler having an opening in its top, a reservoir for the infusion having a mouth in its top, a liquid discharge duct leading upward through said opening, a sealing device on said duct to close said opening, and a grating fixed to said sealing device and having an upwardly directed flange to form a receptacle for the material to be infused, said receptacle closing the mouth of the reservoir.

5. In a device of the class described, a boiler having an opening in its top, a reservoir for the infusion having a mouth in its top, a liquid discharge duct leading upward from the boiler through said opening, a sealing device on said duct to close the space in said opening between the boiler wall and the duct, a grating fixed to said sealing device and having an upwardly directed flange to form a receptacle for the material to be infused, and a second grating slidable on said duct to open the receptacle for filling, said second grating serving during infusion to distribute the discharged liquid throughout the mass of material.

6. A device as in claim 5, in which the duct has a downwardly concave cap fixed at its upper end and apertures above the lower edge of the cap, so that the liquid discharged through the apertures is diverted downward by the cap, said cap preventing the removal of the second grating from said duct.

7. In a device of the class described, a boiler having an opening in its top, a reservoir for the infusion having a mouth in its top, a liquid discharge duct leading upward through said opening, a sealing device on said duct to close said opening, and a grating fixed to said sealing device and having an upwardly directed flange to form a receptacle for the material to be infused, said flange closing the mouth of said reservoir, and a cover having a downwardly directed flange closely fitting within the receptacle flange to seal the same and extending substantially to the said grating, said duct discharging into said cover above the material therein.

8. In a device of the class described, a boiler, a reservoir for the infusion to be infused separably located over and around said boiler, said boiler and reservoir having axial apertures at the tops thereof, a liquid discharge duct leading from said boiler through said apertures and sealed with respect to said boiler, a receptacle for the material to be infused located around said duct above the boiler, and a cap or flange fastened to said boiler and extending over the rim of the reservoir so that the infusion from said receptacle drains into said reservoir.

9. In a device of the class described, a boiler, a reservoir for the infusion, a liquid discharge duct leading from the boiler and sealed with respect thereto, a receptacle for the material to be infused, said duct discharging onto said material and said receptacle draining into said reservoir, and a baffle in said reservoir to define a thin channel for such drainage so that the successive portions of the infusion are substantially prevented from mixing.

10. In a device of the class described, a boiler, a reservoir for the infusion, a receptacle for the material to be infused, and a liquid discharge duct leading from the boiler and sealed with respect thereto, and located at a substantially fixed position of height thereon, the upper end of said duct terminating above said receptacle and having an opening whereby water from the boiler may be forced through the duct and opening onto the material in said receptacle, said reservoir being located beneath the receptacle to receive the liquid draining therefrom, said duct including a sleeve slidable axially along its lower end whereby the lower end of the sleeve may be established at varying levels within the boiler so that trapped vapor in the upper part of the boiler may escape through the duct at a predetermined time corresponding to the discharge of a predetermined quantity of liquid onto the material.

11. In a device of the class described, a boiler, means providing a vapor chamber and including a receptacle for the material to be infused, a duct leading from said boiler into said chamber so that liquid from the boiler may be discharged into the receptacle to prepare the infusion and so that vapor from said boiler may enter the chamber, and a hollow spindle movable in the wall of said chamber when an excess vapor pressure exists therein, the outer end of said spindle being formed as a whistle whereby vapor from said chamber may operate said whistle, said spindle including a duct adapted to establish communication between said chamber and the atmosphere when said spindle is moved to its outermost position whereby vapor may escape directly from the chamber.

12. In a device of the class described, a boiler having a mouth at its top, a liquid duct leading from adjacent the bottom of said boiler upwardly through the mouth, said duct being formed with a sliding joint to close said mouth, a receptacle for the material to be infused resting on said duct, and a vessel to receive the infusion liquid, whereby an excess of pressure in said boiler will operate on said duct to force it upward in said mouth and thereby permit the escape of steam from the boiler past said joint.

13. In a device of the class described, a boiler having a mouth at its top, a reservoir for the infusion, a liquid discharge duct leading upwardly from adjacent the bottom of the boiler and through said mouth, a collar on said duct slidable in the walls of said mouth and having means adapted to seal the mouth when located therein, a grating carried by said collar and having an upwardly directed peripheral flange whereby to form a receptacle for the material to be infused, a second grating slidable on said duct whereby to open the receptacle for filling and serving during infusion to distribute the discharged liquid over the mass of material in the receptacle, a cap fixed to the upper end of said duct and projecting radially therefrom, said cap preventing the withdrawal of said second grating from the duct, and a cover drum fitting around said second grating and within the flange of said receptacle.

14. In a device of the class described, a boiler, a cup fixed at the bottom of said boiler and having upwardly extending walls with perforations therein, a liquid discharge duct leading from within the cup and sealed with respect to said boiler, a receptacle for the material to be infused, and a reservoir for the infusion, said duct discharging onto said material and said receptacle draining into said reservoir and said reservoir surrounding said boiler and extending below the upper edge of said cup.

15. A device as in claim 14, in which a slider is provided at the lower end of the duct whereby the communication of said duct with said boiler may be adjusted to varying levels, said slider being located within the cup, whereby vapor pressure in the boiler will cause the discharge of the liquid in the cup down to the level of the lower end of the slider before the discharge of liquid to a corresponding depth in the boiler outside of the cup.

16. In a device of the class described, a conical boiler having a mouth at its top, a reservoir for the infusion of annular form and separable from and surrounding said boiler, a receptacle for the material to be infused located above said reservoir, and a liquid discharge duct leading from the boiler through said mouth and sealed with respect thereto, said duct having an opening at its upper and adapted to discharge liquid from the boiler onto said material and said receptacle being removably mounted in the top of said reservoir and draining into said reservoir, whereby said reservoir may be separated from said boiler and from the receptacle and duct when the infusion has been completed.

In testimony whereof, I affix my signature.

LOUIS MARCEL POUGET.